J. L. STEVENS.

EGG-BOX.

No. 7,131. Reissued May 23, 1876.

WITNESSES:

Julius Wilcke

C. H. Sherburne.

INVENTOR:

John L. Stevens

By Gridley & Sherburne

Attys.

N. PETERS, PHOTO-LITHOGRAPHER, WASHINGTON, D. C.

UNITED STATES PATENT OFFICE.

JOHN L. STEVENS, OF CHICAGO, ILLINOIS, ASSIGNOR TO BILLINGS, COBURN & CO., OF SAME PLACE.

IMPROVEMENT IN EGG-BOXES.

Specification forming part of Letters Patent No. 163,274, dated May 11, 1875; reissue No. 7,131, dated May 23, 1876; application filed February 21, 1876.

*To all whom it may concern:*

Be it known that I, JOHN L. STEVENS, of Chicago, in the county of Cook and State of Illinois, have invented new and useful Improvements in Egg-Carriers; and I do hereby declare the following to be a full, clear, and exact description thereof, which will enable others skilled in the art to which my invention appertains to make and use the same, reference being had to the accompanying drawing, in which—

Figure 1:
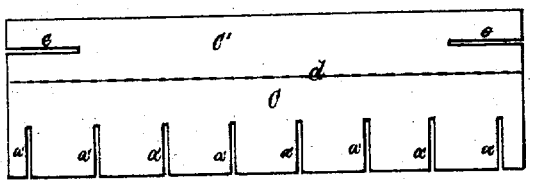
Figure 2:
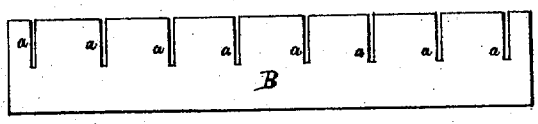
Figure 3:
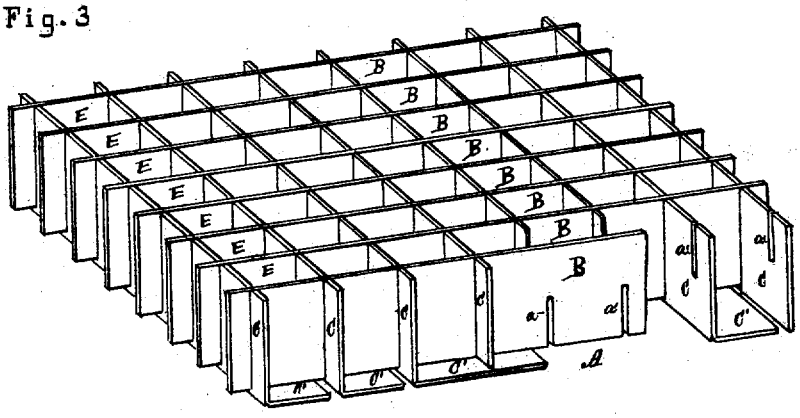
Figure 4:
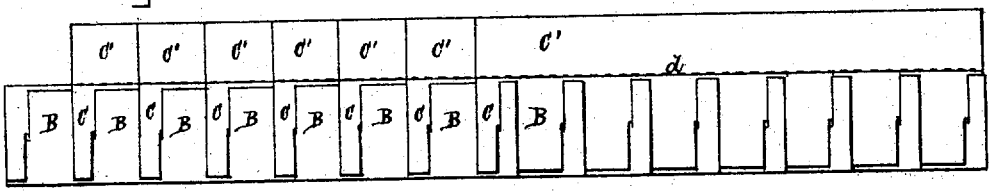
Figure 5:
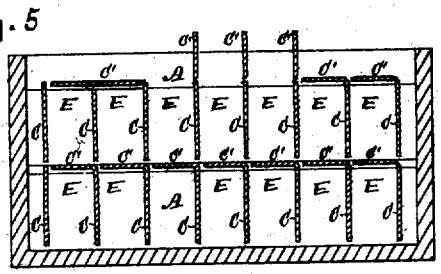
Figure 5:
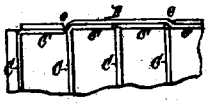

Figures 1 and 2 represent side elevations of the sheets or cards employed in the construction of the trays. Fig. 3 represents a perspective view of one of the trays inverted. Fig. 4 represents a side view of one of the trays when folded, and Fig. 5 represents a diminished sectional elevation of the trays when in position for use.

Like letters of reference indicate like parts.

My invention relates to that class of egg-carriers containing a series of removable trays, constructed of transverse and interlocked cards or strips of pasteboard or straw-board, forming a series of compartments to receive the eggs and separate them from each other; and the object of my invention is to provide a bottom to the several series of compartments in each tray, and so attached thereto that when the eggs are removed the trays may be folded without detaching the bottom. To that end my invention consists in making one series of the cards or strips of straw-board, forming the partitions between the compartments, of sufficient width to admit of being folded or turned to a horizontal position across one or more of the series of compartments, as will be more fully understood from the following description.

In the drawing, A represents the egg-carrier proper, consisting of a series of trays. Each of the trays consists of a series of longitudinal strips or diaphragms, B, and of transverse strips or diaphragms C, made of straw-board or other suitable material. Each of the strips B is provided on one edge, which I will designate as the lower edge, with a series of slots, *a*, cut therein, at a graduated distance one from the other, and extending to the center of the strip, and each of the strips C is provided with a like series of slots, *a′*, cut in its upper edge, extending toward the center of the sheet a distance equal to one-half the width of sheet B. The arrangement of the slots in the respective series of strips B C is such as to admit of said strips being locked together when arranged at right angles, one to the other, and thereby forming cells or compartments E, each of proper size to freely admit an egg. The strips C exceed the sheets B in width by about the distance of from one slot, *a*, to another, and are scored or cut partly through on one side longitudinally, thereby forming a part, C′, which is so connected to the part C as to admit of being folded to a horizontal position, the part C being equal in width to the sheet B, and the part C′ being of a width equal to the distance between the slots *a′ a′*.

When the strips B C are locked together to form the compartments, the part C′ of the strip C is folded on the scored line *d* to a horizontal position, and to and against the edge of the sheets B, thereby forming a top or bottom, as desired, to the compartments in each tray; and when forming the top of the tray, it also answers as a bottom to the compartments in the next tray placed thereon. The scoring of the strip C, as described, permits of the part C′ being folded without breaking or becoming detached from the part C.

A series of trays, constructed as described, may be arranged one above the other, in a suitable shipping-case, when the eggs will be separated from each other laterally by the diaphragms, and supported separately, one above the other, by the bottom C′. The trays, when removed from the case, or packed for transportation separately from the case, may be compactly folded in the position shown in Fig. 4 by turning the parts C′ back in the same plane with the part C. Instead of providing each strip or diaphragm C with the part C′, each alternate strip C may be made to fold in the manner described, each folded part being made of double the usual width, extending to or nearly to the other. *e e* are cuts in the ends of the parts C′ C′, and D is a strip of straw-board or other suitable material, one of which is woven through each set of cuts

*e e*, when the parts C′ are folded; but neither the cuts *e e* nor the strips D D are essential, except for the purpose of retaining the parts C′ C′ in their folded position, in order that the trays may be removed, together with their contents.

I do not intend to limit myself to the folding part C′ when used in folding trays only, as the same may be used in connection with trays not calculated to be folded.

I am aware that folding compartments have heretofore been employed, in connection with detached separating sheets or diaphragms and a shipping-case, for the purpose herein set forth, and I do not here claim such; but,

Having thus described my invention, what I claim as new, and desire to secure by Letters Patent, is—

1. The removable tray A, formed of transverse and longitudinal strips, the former provided with the part C′, adapted to fold across one or more of the series of compartments, substantially as specified.

2. An egg-carrier provided with removable trays A, divided into compartments E, the trays consisting of the series of strips B C, having the slots *a a′*, whereby the strips are locked together, the strips C being provided with the part C′, adapted to fold across one or more of the series of compartments, substantially as specified.

JOHN L. STEVENS.

Witnesses:
N. C. GRIDLEY,
N. H. SHERBURNE.